US006632250B1

(12) United States Patent
Lynch et al.

(10) Patent No.: US 6,632,250 B1
(45) Date of Patent: *Oct. 14, 2003

(54) METHOD AND SYSTEM FOR CREATING A CARD

(75) Inventors: Jerome A. Lynch, Chanhassen, MN (US); Scott D. Miller, Woodbury, MN (US); Joel T. Powell, Eden Prairie, MN (US); Jonathan H. Stechmann, Minneapolis, MN (US); Timothy A. Zurn, Brooklyn Park, MN (US)

(73) Assignee: Datacard Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/394,013

(22) Filed: Sep. 10, 1999

Related U.S. Application Data

(60) Provisional application No. 60/124,922, filed on Mar. 17, 1999, and provisional application No. 60/099,949, filed on Sep. 11, 1998.

(51) Int. Cl.⁷ .......................... G06F 15/00; G06F 17/00
(52) U.S. Cl. ..................... 715/517; 715/505; 715/507; 715/508; 358/540
(58) Field of Search ................................ 707/505, 507, 707/508, 517; 715/505, 507, 508, 517; 358/540

(56) References Cited

U.S. PATENT DOCUMENTS

| 4,675,746 A | 6/1987 | Tetrick et al. ............... 358/296 |
| 4,687,526 A | 8/1987 | Wilfert et al. ................. 156/64 |
| 4,873,643 A | 10/1989 | Powell et al. ............... 364/468 |
| 4,954,969 A | 9/1990 | Tsumura ..................... 395/160 |
| 4,999,065 A | 3/1991 | Wilfert ........................ 156/6.4 |
| 5,025,399 A | 6/1991 | Wendt et al. ................ 395/117 |
| 5,075,769 A | 12/1991 | Allen et al. ................. 358/500 |
| 5,343,386 A | 8/1994 | Barber ........................ 364/400 |
| 5,410,642 A | * 4/1995 | Hakamatsuka et al. ..... 358/1.14 |
| 5,617,528 A | 4/1997 | Stechmann et al. ......... 395/326 |
| 5,649,216 A | * 7/1997 | Sieber ......................... 707/506 |
| 5,889,941 A | * 3/1999 | Tushie et al. ............... 713/200 |
| 5,930,811 A | * 7/1999 | Nojima et al. .............. 707/517 |
| 6,038,012 A | * 3/2000 | Bley ............................ 355/40 |
| 6,325,292 B1 | * 12/2001 | Sehr ............................ 235/492 |

OTHER PUBLICATIONS

"DataCard QuikWorks Remote Capture System", 1997, DataCard Corporation, pp. 1–2.*

* cited by examiner

Primary Examiner—Joseph H. Feild
Assistant Examiner—Almari Romero
(74) Attorney, Agent, or Firm—Howrey Simon Arnold & White LLP

(57) ABSTRACT

A card creation method and system includes defining a data entry screen including a plurality of screen fields and creating at least one card layout, including defining specific positions for a plurality of card fields. Data is input into the screen fields using the data entry screen, and then transferred to a one of the card layouts to create the card. The data entry screen definition and the card layouts may be saved prior to inputting data. Still further, a data source having at least one data field may be identified for providing data, and a screen field may be linked to a data field. Data from the data field is copied to the linked screen field. Additionally, a card filed may be linked to a selected screen field. The created card may be saved and/or printed. Thus, a user is able to create customized data entry screens, as well as custom card designs.

13 Claims, 5 Drawing Sheets

METHOD AND SYSTEM FOR CREATING A CARD

CROSS REFERENCE TO RELATED APPLICATIONS

This application claims the benefit of U.S. Provisional Application No. 60/099,949, filed Sep. 11, 1998, and U.S. Provisional Application No. 60/124,922, filed Mar. 17, 1999. Both of these Provisional Applications are incorporated herein by reference in their entirety.

BACKGROUND OF THE INVENTION

1. Field of the Invention

The present invention relates to a card design and creation system and method.

2. Description of Related Art

Through time, a wide array of card creation systems and methods have been employed to produce cards for a multitude of applications, including employee badges, student identification badges, membership cards, transaction cards, and other photo identification cards.

Many prior art card creation systems are rather expensive, requiring rather elaborate card production equipment and specially trained operators. In addition, such systems are not suited for making a card on demand such as is often the case with various membership cards, badges, etc. Moreover, few systems are capable of capturing images and printing them on a card. While some systems do exist for making a membership card or the like on demand, these systems are typically rather limited in their capability and oftentimes do not allow storage and/or retrieval of card holder information to and from various database structures. Such systems also do not allow much flexibility in the layout of card designs. Still further, existing card creation systems only provide a predefined data-entry screens, leaving little, if any, flexibility for the user to create or modify the data entry environment.

The card creation system disclosed in U.S. Pat. No. 5,617,528, assigned to applicants' assignee, addressed many of the disadvantages perceived in the prior art. (This patent, U.S. Pat. No. 5,617,528, is hereby incorporated by reference herein.) While it is believed that the apparatus and method disclosed in the '528 patent presented significant improvements over the previously known card creation systems and methods, time has shown that there is still room for further improvement.

The present invention provides a card creation system and method which offers numerous advantages and improvements over existing systems.

SUMMARY OF THE INVENTION

The present invention provides the desired improvement by providing an improved system and method for interactively creating a card. More specifically, the improved system and method of the present invention comprises a software platform for producing personalized photo identification cards that, among other things, allows a user to create customized data entry screens and card designs.

In one aspect of the present invention, a method for designing a card includes creating at least one card layout and defining a data entry screen for receiving card data. The method may further include identifying a data source for the card data. In specific embodiments, the data source may comprise a database including data fields, and screen fields from the data entry screen may be linked to selected data fields.

In accordance with further aspects of the invention, a card creation method includes defining a data entry screen including a plurality of screen fields and creating at least one card layout, including defining specific positions for a plurality of card fields. Data is input into the screen fields using the data entry screen, and then transferred to one of the card layouts to create the card. The data entry screen definition and the card layouts may be saved prior to inputting data. Still further, a data source having at least one data field may be identified for providing data, and a screen field may be linked to a data field. Data from the data field may then be copied to the linked screen field. Additionally, a card field may be linked to a selected screen field. The created card may be saved and/or printed. In an exemplary embodiment, a card layout is selected in response to the particular data input to a given screen field.

The various methods disclosed herein may be implemented by a computer system. In one embodiment, a data entry screen definition including a plurality of screen fields input by an operator via an input device is received by the computer, and at least one card layout, including specific positions for a plurality of card fields via the input device, are similarly received by the computer system. The entry screen is displayed on a display device, and data is received into the screen fields. The data may be entered by an operator via the input device. The received data is transferred to a card layout to create the card, and the created card is displayed on the display device. Further, the computer system may receive an identification of a data source, and data may be copied from the data source to the screen fields.

BRIEF DESCRIPTION OF THE DRAWINGS

Other objects and advantages of the invention will become apparent upon reading the following detailed description and upon reference to the drawings in which.

Figure 1:
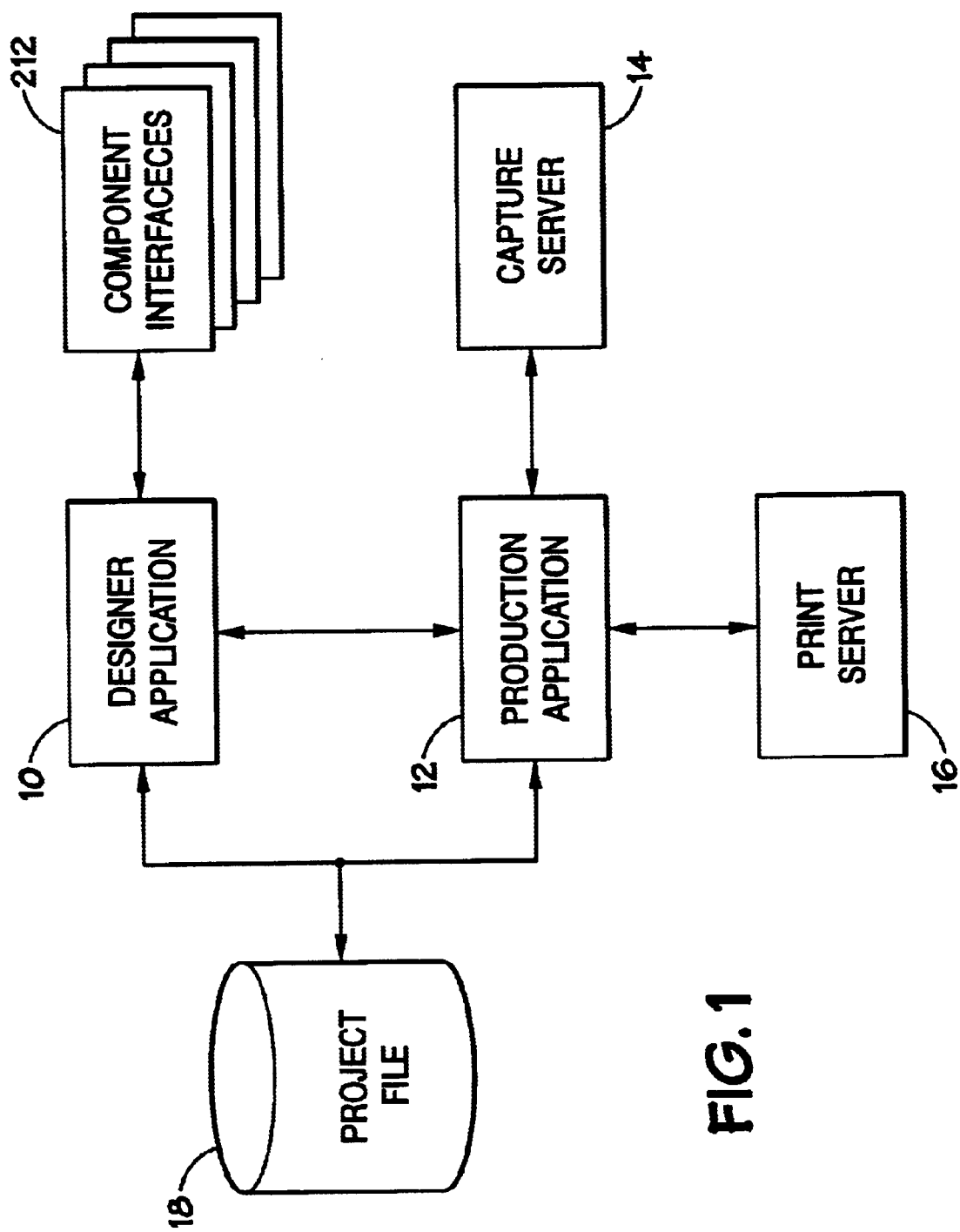
FIG. 1 is a block diagram illustrating major components of a card creation system in accordance with embodiments of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Various aspects of the present invention are embodied in an application offered by DataCard Corporation, referred to herein as the "ID WORKS" photo ID software. By contrast, the apparatus and method for interactively producing a card disclosed in U.S. Pat. No. 5,617,528 will be referred to herein as the "QUIKWORKS" photo ID software.

The ID WORKS application provides a 32-bit software platform for producing personalized photo identification cards. The system is meant to be a replacement for the 16-bit QUIKWORKS photo ID software now being offered by DataCard. As the next generation photo ID software, the ID WORKS photo ID system provides several new features and enhancements over that provided by the QUIKWORKS photo ID system. An objective of the ID WORKS photo ID system is to provide an easy to use, 32-bit solution for card design, data capture, and data management functioning under the Window's NT environment allowing access for 3rd party customization.

The ID WORKS photo ID software system consists of a modular architecture built from a set of individual software components. Referring to FIG. 1, the major components of the ID WORKS software system include a designer application 10, a production application 12, a capture server 14, and a print server 16. These components may be bundled together to comprise a full ID WORKS photo ID system. Alternatively, these components may be offered separately or in a variety of combinations with programming instructions to comprise a software development kit (SDK). SDK's are useful in allowing developers, particularly VARs (value added resellers), customize ID WORKS software to meet specific customer needs. The components illustrated in FIG. 1 are further described below.

The designer application 10 can be used to create custom data entry screens and custom card designs. Also, it can be used to define the properties that link the data entry screen fields to database fields. Collectively, the data entry screen, card designs, and database associations produced by the designer application are referred to as a "project." The designer application 10 can only be accessed by a user having supervisory rights, such as a system administrator, so as to control who has the ability to create or modify projects.

The production application 12 is used to enter user data, capture images, print and encode cards, and save the information to a database. The production application 12 first opens a project file 18 containing the data entry screen, card design(s), and database associations defined using the designer application 10. Production personnel can enter user data into the data entry screen via an input device. The capture server 14 provides an interface between a client application and a capture device, such as a digital camera, a signature pad, a scanner, a fingerprint device, etc. The role of the capture server 14 is to support several devices via a common interface to minimize change in the client application such that newly developed capture devices may be supported.

The ID WORKS software system also employs a variety of support components, which are discussed in greater detail below. These include a database connectivity component, a print preview server, a security component, a user management component, a private labeling component, and a license management component. These support components are not distributed as stand-alone components, but rather are embedded in some other component or are distributed only as part of the full ID WORKS system.

The database connectivity component may be employed with the designer application and/or the production application. The database connectivity component provides a mechanism for a user of the designer application to view database columns that can be associated with a field on the data entry window. The production application uses the database connectivity component to add, update, retrieve, and delete records in the database.

The print preview server component provides the ability to preview the layout of a card design, including the text and images, prior to printing the card design on a printer. The print preview server component is embedded within the print server component and may be distributed as part of the production application and/or the ID WORKS SDK.

The security component and user management (accounts) component work together to verify that a valid user is attempting to access the designer application and/or the production application. The user management component is used to create and manage ID WORKS system users and set each user's rights. The security component uses the information created by the user management component to restrict user access to only those components to which the user has a right. The security component and user management component are only distributed as part of the full ID WORKS system, not as part of the ID WORKS SDK.

The private labeling component allows an SDK developer to replace DataCard labeling with their own, making the product appear to be their creation. The private labeling component is only distributed as part of the ID WORKS SDK.

The license management component provides a mechanism for guaranteeing that only legally purchased copies of the ID WORKS software are able to execute. The license management component replaces the hardware dongle supplied with the QUIKWORKS system as a safeguard against unauthorized use. The license management component will be included in all ID WORKS system deliverables, including the full ID WORKS system and the ID WORKS SDK.

The aforementioned components are designed in a modular fashion employing Microsoft's component object model (COM) technology. COM-based programming is a well known technique which provides the ability to integrate a multitude of software to applications, regardless of differences in programming languages used to create the various software applications. COM accomplishes this by defining a common way of accessing all kinds of software services such that various software applications can exchange their services without being affected by differences in development environments. This service exchange mechanism is referred to as an "interface" or a "hook." By creating the ID WORKS system with COM-based programming, the functionality of the overall system can be broken down and packaged as separate modular components, with each component having hooks for exchanging services with each other. The hooks also provide the ability to add other components not provided with the full ID WORKS system to create a customized photo ID solution, such as with the ID WORKS SDK.

The ID WORKS photo ID system is also Internet ready, boasting the ability to store and retrieve projects on a web server. This is in addition to the system's customized database capability.

The Designer application encompasses necessary tasks a user must complete to run the data entry application for card production. This includes creating data entry screen designs, card designs, selecting and configuring encoders, selecting and configuring capture devices, selecting a data source or data provider, and setting up event handlers. As disclosed above, the Designer application uses the "project" concept. A project can consist of zero to one data entry screen designs, zero to many card designs, the connection to a data source or data provider, and the field relationships (links). Field relationships can exist between screen fields and card fields and/or screen fields and data source or data provider fields. Projects may further include additional components, such as report designs and image check screens.

Once a project is created it can be opened by production and used to capture data and/or produce cards. Projects can also be duplicated within the designer application (using a "Save As" function), in essence using a previous project as a template for a new project. Projects may be exported from the Designer application on one system and imported to the data entry app and/or the designer app on another system.

Data entry screen designs, one possible component of a project, are designed by users to capture data. Users can configure the properties of the screen (e.g. background, database buttons) as well as place data entry fields on the screen and configure the fields as needed.

Card designs, another possible component of a project, are designed by users to print personalized cards. The user can configure the properties of the card (e.g. background, top coat) as well as place card fields on the card and configure the fields as needed. Encoder design may also be contained within a card design. Encoder designs include such properties as encoder name and configuration.

Database designs, another possible component of a project, are the connection between an existing database and a project. Unlike the other components of a project, a user does not visually create a database design. Instead, a database design is created when a user selects an existing database for a project and a database field is created when a user links a data entry screen field to an existing database table and column.

Users may connect (link) screen fields to database fields, for data storage and retrieval during production, and screen fields to card fields to personalize and print cards during production. Since the screen is the center point of connecting fields, these connections are stored in the data entry screen design.

Figure 2:
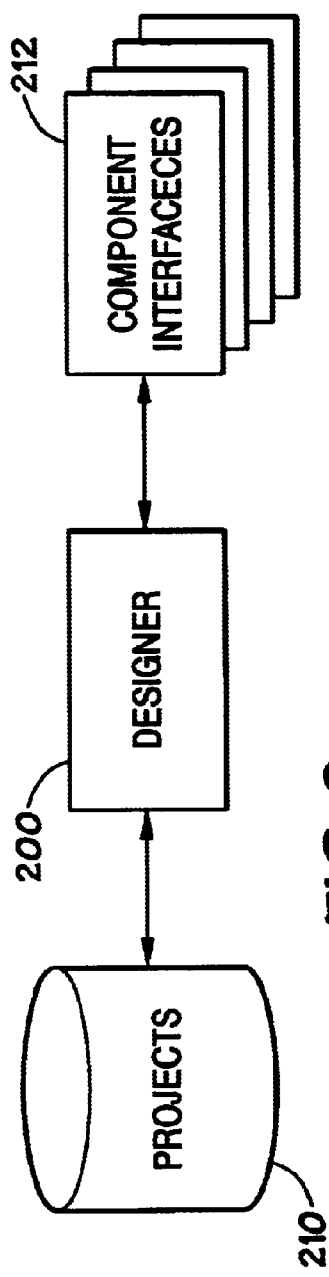
FIG. 2 is a block diagram illustrating aspects of the Designer application of an embodiment of the present invention.

The Designer application interacts with other system components, as shown in FIG. 2. The Designer application 200 writes all aspects of a project to files 210 using Microsoft Foundation Class' (MFC) serialization methods. These files can then be read during production by the other components 212 of the system. Specific interfaces 212 include the following:

Database Interface: The database interface provides the Designer application with its database functionality. This functionality includes connecting to a data source or data provider, selecting tables, and connecting a screen field to a database columns in a table.

Capture Server: The capture component provides the designer application with a COM interface that allows users to choose a capture device and create a new capture script or choose an existing capture script.

Card Production Server: The print engine provides the designer application with a COM interface that allows users to choose an encoding device and create a new encoding configuration or choose an existing encoding configuration.

Licensing Interface: The licensing interface provides the designer application with an interface that allows it to verify that users are licensed to run the designer application.

Security Component: The security component provides the designer application with a COM interface for security. The designer application uses the security component is to log users in and out and to determine their privileges.

RAS Interface: The RAS interface provides the designer application with an interface that allows it to log any internal application errors.

Audit Log Component: The audit log component provides the designer application with a COM interface to log users actions.

Event Handler: The designer application provides a mechanism for users to assign third party software components ("event handlers").

Import Export Component: The import export component provides the designer application with a COM interface to allow users the ability to Import or Export a project to or from the designer application.

Figure 3:
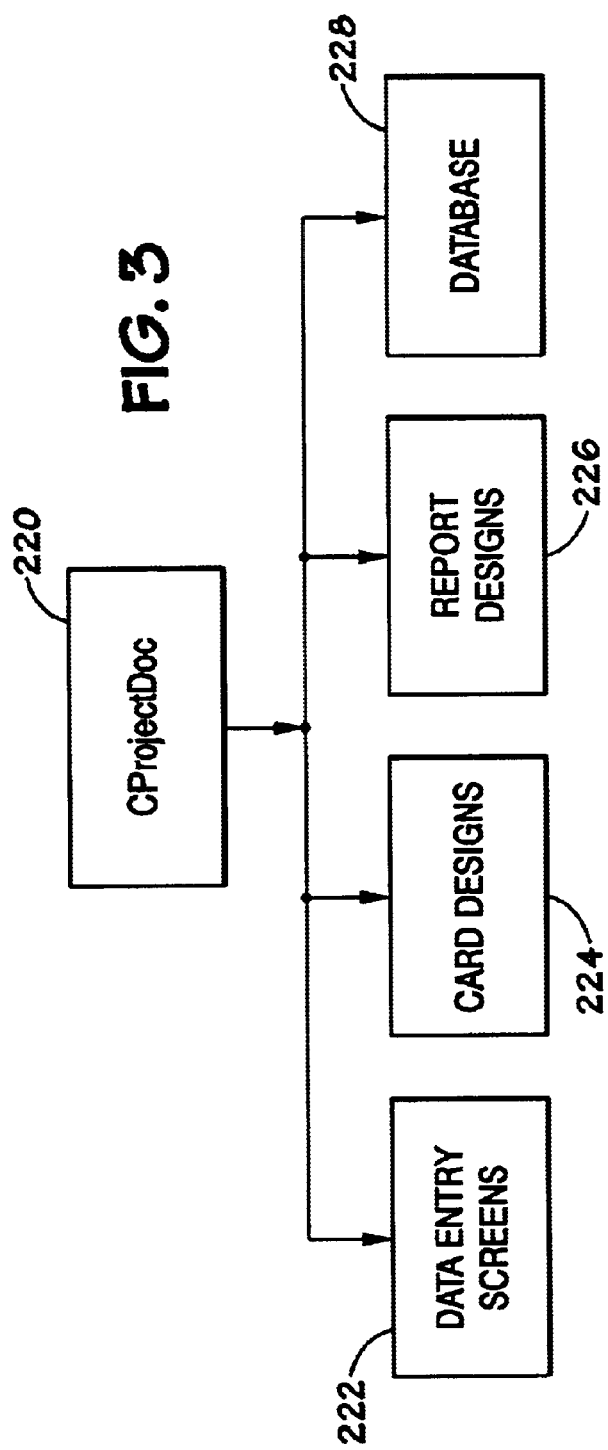
FIG. 3 is a block diagram illustrating aspects of the project document of an embodiment of the present invention.

The Designer application 200 functions to create the project document "CProjectDoc" 220, shown in FIG. 3. The project document 220 will contain all the design data (actually pointers to all the design data) for an entire project. This includes data entry screen designs 222, card designs 224, report designs 226, the connection to a data source 228 or a data provider, etc. Using MFC's multiple document interface (MDI) a project will have multiple views of this design data. Each view will be contained in its own child frame window. These views and frames create the screen designer, card designer, and the relationships window. A user can use these frames and views to create or modify a project's design data.

Figure 4:
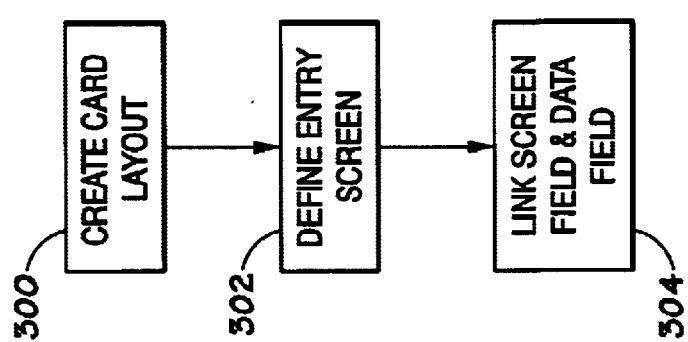
FIG. 4 is a flow diagram illustrating a method for designing a card in accordance with aspects of the present invention.

As discussed above, among other things, the present invention thus provides a novel system and method of designing a project, and ultimately a card. FIG. 4 illustrates broad aspects of such a method, which may be implemented by a computer system as is known in the art. An exemplary card creation system is illustrated in FIG. 5.

Figure 5:
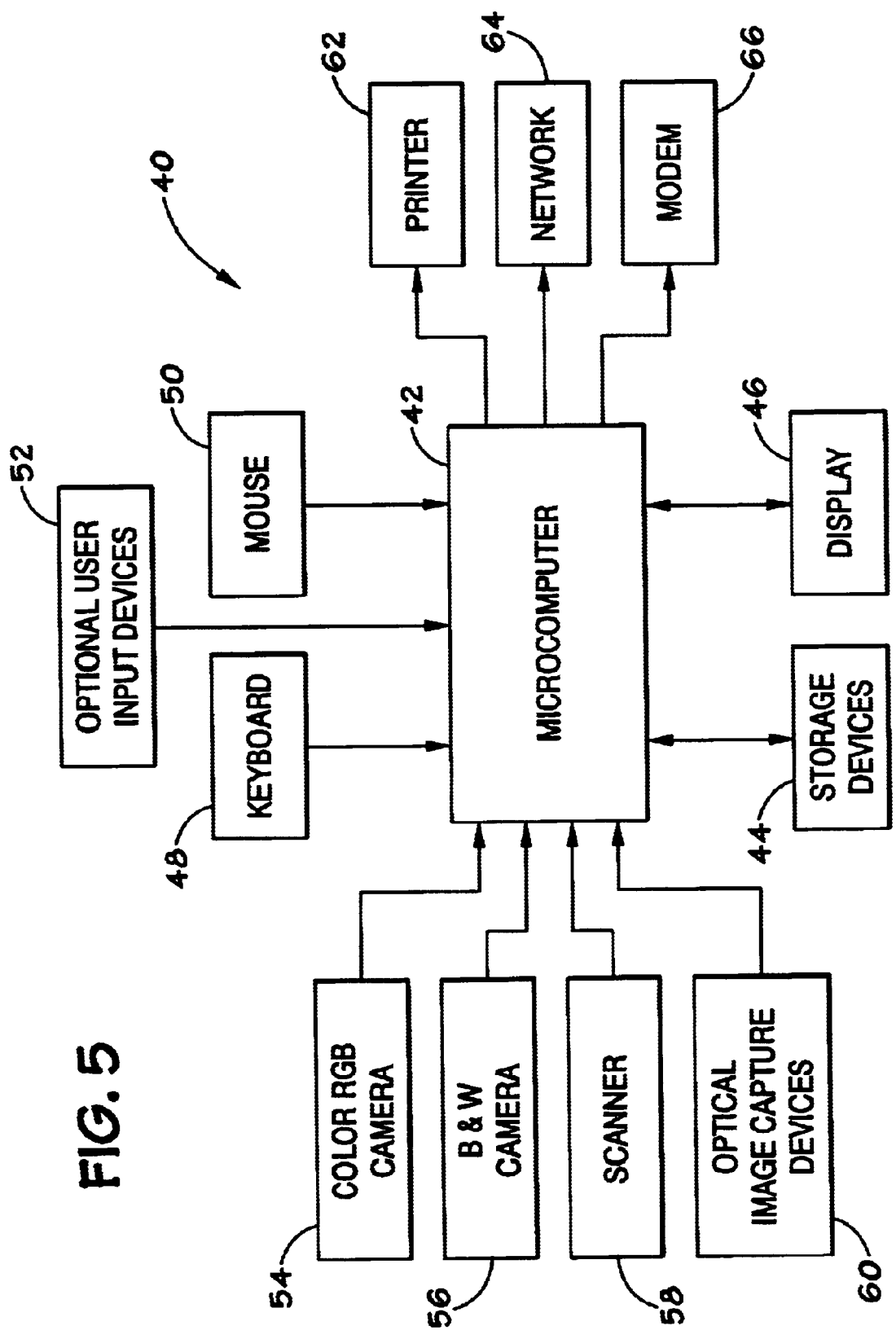
FIG. 5 is a block diagram illustrating a card creation system in accordance with embodiments of the present invention.

Referring to FIG. 5, the exemplary system 40 includes microcomputer 42 having a conventional processor such as a Pentium® processor, a Pentium® Pro processor, a 8051 processor, a MIPS® processor, a Power PC® processor, an ALPHA® processor, etc. In addition, the microcomputer 42 includes appropriate storage devices 44 such as a hard disk drive, compact disk drive (CD ROM), a floppy disk drive, etc. The storage devices might be used for storing various programs and for storing card holder information. The microcomputer 42 includes a display device 46 for displaying various information including card holder information. This monitor/display 46 displays graphic and live video images. Input devices are interconnected to the microcomputer 42 for providing data entry, including a keyboard 48, a mouse 50, and additional optional user input devices 52 that might also be present for inputting various information.

Additional components may include a color red-green-blue (RGB) camera 54, a black and white camera 56, a scanner 58 and additional optional image capture devices 60. For example, a signature capture device which captures the image of a cardholder signature to the card may be present. A color printer 62 may be interconnected to the microcomputer 42 for printing cards created according to the methods disclosed herein. The microcomputer 42 of the system 40 might be a stand alone computer or it might be interconnected to a plurality of other terminals by a suitable network connection 64. In addition, other devices such as a modem 66 might be interconnected to the microcomputer 42 so as to allow communication with remote terminals, image capture devices, printers, etc. In addition, a magnetic stripe encoder (not shown) may be used to apply a magnetic security code to the card. Also, the image capturing site may be augmented by a camera tripod, counter stand, backdrop, or other accessories as needed.

Referring now to FIG. 4 and FIG. 5, at least one card layout is created by a user and input into the microcomputer 42 via the input devices 48, 50, 52 in block 300. In block 302, a user-defined a data entry screen for receiving card data is similarly input. Typically, designing a data entry screen includes defining and pacing several screen fields on the data entry screen, such as static and variable text fields, image fields, barcode fields, graphics fields (including bmp, tiff, tga, psd, pcx, eps, png, wmf, jpg, gif formats), smart card fields, magnetic stripe (magstripe) fields, and signature fields. "Smart card" generally refers to a card that contains electronic memory, and possibly an embedded integrated circuit (IC). Some field types, such as smart card, magstripe and signature fields, are actually "blocking regions," wherein portions of the card are designated as these types of fields, preventing positioning or printing other fields in these portions. Properties for each screen field are also defined, including color, font, capture device, etc.

Thus, the system and method of the present application allow a user to create a custom data entry screen and one or more custom card designs, rather than relying only is on "canned" entry screens and card designs. Additionally, the user may identify and input a data source for the card data, such as an existing database. Such databases may be created and maintained using standard database applications, such as ORACLE, UNIFY 2000, VISUAL FOXPRO, MS SQL SERVER, ACCESS, etc.

As is well known in the art, such databases include a plurality of data fields. In block 304 of FIG. 4, a selected screen field is linked to a selected data field, such that data from the specified data field may be transferred to the linked screen field. In some embodiments, a desktop-type database (as opposed to a server-based database) may be defined, eliminating the need for a complete, separate database package.

The Production application of the ID WORKS application is where the user captures and manipulates text and binary data, interfaces with a database, and prints and encodes cards. The Production application consists of a number of different components. Each component exposes an interface (or multiple interfaces) so that each component's functionality is available to the other components of the system.

Figure 6:
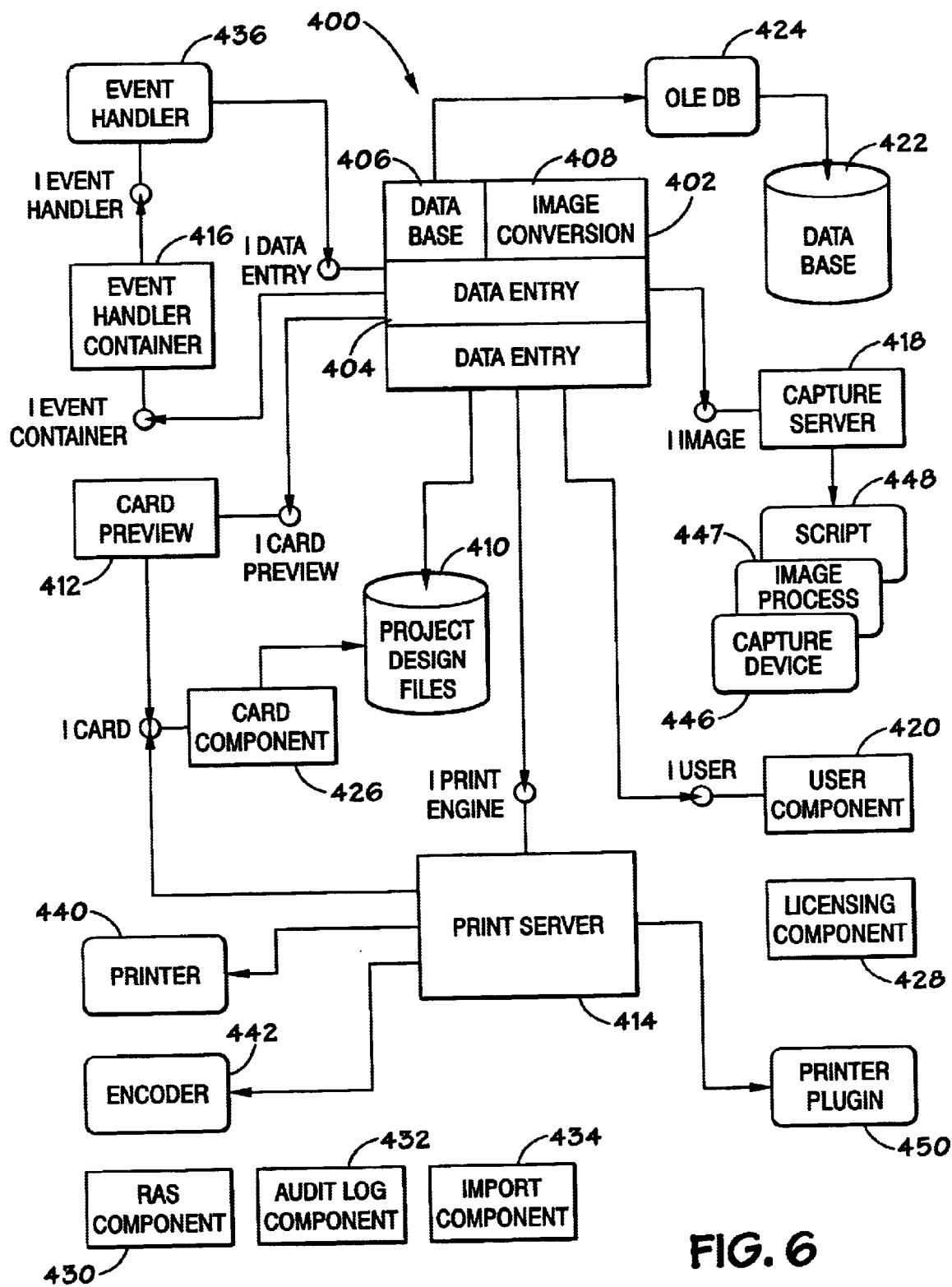
FIG. 6 is a block diagram illustrating aspects of the Production application of an embodiment of the present invention.

The Production application is illustrated schematically in FIG. 6. The Production application 400 includes a data entry application 402 having three separate software parts—data entry 404, Database 406, and Image Conversion 408. Functions of the data entry 404 component include opening and closing projects 410 created with the Designer application, displaying the user-defined data entry screen associated with a project 410, managing data entry within the data entry window, sending/retrieving information to/from the database component 406, sending information to a card preview window 412, sending print requests to a print server 414, notifying the event handler container 416 of events, and sending capture/processing/script requests to a capture server 418.

The data entry component 404 interfaces with a user component 420 to determine whether a user is currently logged on and, if so, to determine the currently logged in user's capabilities. The data entry component 404 will interface with the database component 406 to a user's database capabilities.

The database component 406 provides the data entry component 404 with database functionality. The database component 406 will provide the means for a field contained by the data entry application 404 to be bound to a column in a database table 422. In the illustrated embodiment, the database component 406 is contained by the data entry application 402; its interface to the data entry application 404 is not a COM interface. The database component 406 interfaces to the database 422 using OLE DB 424.

The image conversion component 408 provides the data entry component 404 with image compression and decompression functionality. The functionality is exposed via an API. As with the database component 406, the image conversion component 408 is contained by the data entry application 402; its interface to the data entry application 402 is not a COM interface.

The event handler container 416 is the piece of code that handles the distribution of events to third party software (event handlers). The data entry component 404 sends event notifications to the event handler component 416, which is responsible for loading and calling the third party event handlers. The event handler container 416 is called every time that a project is opened, a project is closed, and when events occur while a project is opened. Some examples for events include entering and exiting a field, inserting a record, updating a record, deleting a record, and printing a card.

The card preview component 412 provides the data entry component 404 with a COM interface that allows the creation and control of a card preview window. To use the interface, the data entry component 404 selects a card design to preview and then sends data for each of the fields on the selected card design. As the field data is sent to the card preview component 412 the card preview window is updated with the new field information. The card preview component 412 also is able to return card field information of the currently selected card to the data entry component 404.

The card component 426 provides the card preview component 412 and the print server 414 with card field information and card drawing capabilities. The card component 426 is able to associate data with card design fields (the data used to draw the card). The card component 426 reads card design files (part of the project design files 410) that have been written by the Designer Application.

The licensing component 428 provides licensing capabilities. The software components for which licensing is required interact with the licensing component's 428 API to determine whether or not the software component is allowed to run on the computer in which the it currently resides.

All the software components in the Production application 400 are responsible for writing information to the RAS log. The RAS software component 430 provides the interface for writing to the RAS log. The Production application 400 keeps a log of user actions that take place during card production, for example, "user x printed card y", "user x deleted a record", etc. The audit log component 432 provides the interface that is used to write information to the Audit Log. The data entry application 402, the user component 420, and the Print Server 414 all use the interface that the audit log component provides to write information to the Audit Log. The import component 434 is used by the data entry component 404 to read projects that have been exported by the export component.

The print engine provides the data entry application with a COM interface that allows the printing and encoding of cards. To use the interface, the data entry application 402 selects a card design to print and then sends data for each of the fields on the chosen card design. The print engine will then print and/or encode the card.

The user component 420 provides the data entry component 404 with a COM interface for user capabilities. The data entry component 404 uses the COM interface to determine if a current user is logged in and what the current user's capabilities are. The data entry component 404 uses this information to limit the current user's access to the authorization-protected portions of the application.

The capture server 418 provides the data entry component 404 with a COM interface that allows the capture of images and the processing of existing images.

OLE DB 424 provides the means to interface with the list of supported databases. Is OLE DB 424 handles all interactions with the database 422. Project design files 410 contain the information (properties and objects) for each project. The Designer application writes the project design files 422. Both the data entry component 404 and the card component 426 read the project design files 422. The project design files 422 are written and read using the serialization mechanism provided by MFC.

Event handlers 436 are called when events happen in the data entry component 404. Examples of events include entering and exiting a field, inserting a record, updating a record, deleting a record, printing a card, etc. Event handlers 436 are typically written by third party software developers to customize some aspect of data entry. Event handlers 436 interface with the IDataEntry interface that the data entry component 404 provides. By utilizing IDataEntry an event handler is able to customize the content and actions of the data entry screen.

The Production application 400 further may include printers 440 for printing cards. The print server 414 is responsible for writing to printers 440. Encoders 442 may be provided for encoding devices that reside on cards. Some examples are magstripe and smart card. The print server 414 is also responsible for writing to encoding devices 442.

Image processes 444 are enhancement algorithms that are run on existing images. The capture server 418 provides a means to call image processes 444. A set of standard image processes 444 are provided with the capture server 418. Capture devices 446 are used to capture binary information, usually an image (it may be fingerprint minutia or some other binary data). The capture server 418 provides a means to call the installed capture devices 446. Scripts 448 are a sequence of zero or one capture devices 446 and zero or more image processes 444. The Script 448 concept allows a single name to be associated with a sequence of many actions. The data entry component 404 directs the capture server 418 to perform a script 448 during both capture and image processing. Printer plugins 450 are used with the print server 414. Printer plugins 450 provide printer specific code that is required to do things such as topcoat and encoding.

Figure 7:
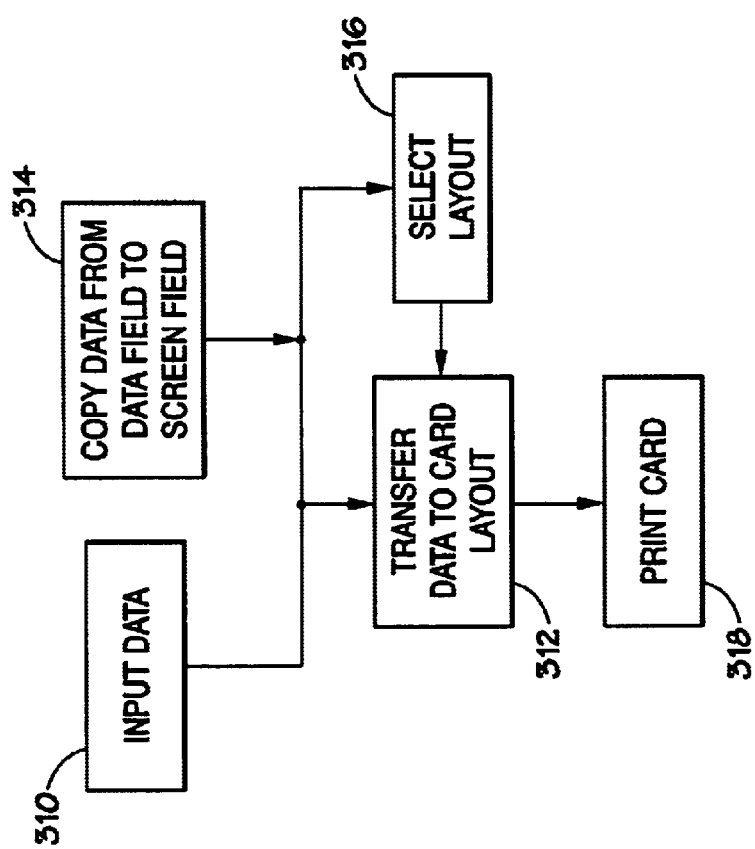
FIG. 7 is a flow diagram illustrating a method for creating a card in accordance with aspects of the present invention.

FIG. 7 illustrates additional aspects of a method in accordance with the present invention. Once a data entry screen, including screen fields and one or more card layouts have been defined as illustrated and described in conjunction with FIG. 4, data is input into the screen fields using the data entry screen in block 310. The microcomputer 42 than transfers the data to a selected one of the card layouts to create the card in block 312. In certain embodiments, the data entry screen definition and the card layouts created, for example, according to FIG. 4, are saved prior to inputting data in block 310. However, it is possible to create data entry screens and card designs, then enter data without saving the entry screen and card layouts.

As shown in block 304 of FIG. 4, a data source having data fields may be identified, and screen fields may then be linked to a selected data fields. The microcomputer may then copy data from the selected data fields to the linked screen field as illustrated in block 314. Further, a card field may be linked to a screen field, such that data is transferred from the database to the card layout. 19. Screen fields may be "hidden," so that the data transferred form the database is not shown to the operator. This gives the appearance of transferring data directly from a data field to a card field, though in the disclosed embodiment, data is transferred from the data field, to the screen field, then to the card field. Hidden fields are typically used for sensitive data, such as a social security number that is to be encoded in a bar code field. The social security number is read from the data field to the linked hidden screen field, then transferred to the bar code field on the card without the operator seeing the sensitive data.

Still further, particular card layouts created as shown in block 300 may be linked to a screen field. Then, the card layout to which the data is transferred is determined based upon the data input into the screen field, as shown in block 316. This is referred to as "data driven" production. This allows a user to associate particular user-defined card layouts with specific entry screen fields, and select a particular layout based upon the entered data.

Block 318 illustrates printing the created card. In accordance with some embodiments of the invention, the number of times a particular created card has been printed is tracked. This allows an operator to disable previously printed cards. As discussed above, several types of fields may be included on the card layout, including barcode, magstripe, smart card, etc. Accordingly, the present invention provides for encoding the particular device associated with the field. Moreover, the disclosed methods include capturing graphic images, such as photo images, for graphic fields, and this capability may be automated based on the field designation.

Figure 8:
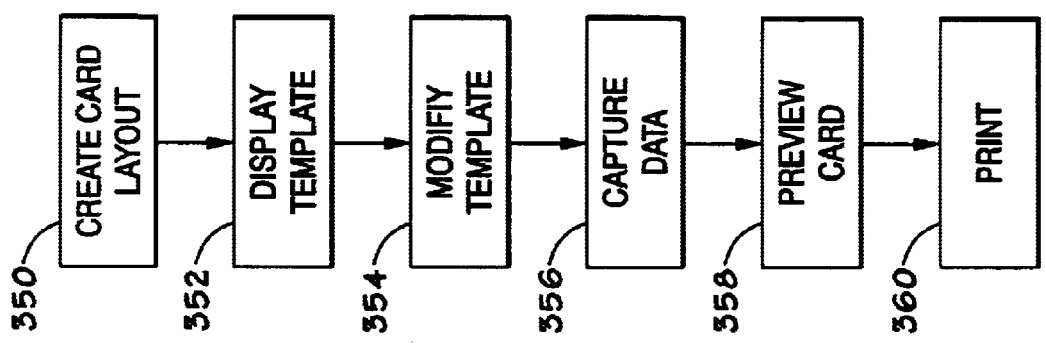
FIG. 8 is a flow diagram illustrating another method for designing a card in accordance with further aspects of the present invention.

Is In still further embodiments of the invention, card templates are provided to provide a starting point for designing a card layout. As shown in FIG. 8, an alternative method includes defining a data entry screen (block 350), then interactively creating a card design by displaying a predetermined card template (block 352) and modifying specific positions on a planar surface of a card for each layout frame of a video picture, cardholder information fields, and static fields (block 354). In block 356, cardholder information corresponding to the cardholder information fields is captured, or input, using the data entry screen. The operator then previews an image of a card having the card design including the video picture, cardholder information, and static fields within the predetermined card design substantially as can be printed in block 358. In block 360, the card is printed.

It will be apparent to those of ordinary skill having the benefit of this disclosure that the various methods disclosed herein may be implemented by programming one or more suitable general-purpose computers having appropriate hardware, such as the microcomputer 42 shown in FIG. 5. The programming may be accomplished through the use of one or more program storage devices 44 readable by the computer and encoding one or more programs of instructions executable by the computer for performing the operations described above. As disclosed above, the program storage device 44 may take the form of, for example, one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Some of the claims below recite the performance of certain operations or functions. It will be understood, by those of ordinary skill having the benefit of this disclosure, that the operations or functions in question are not necessarily required to be performed in the specific order in which they are listed in the claims.

What is claimed is:

1. A method of creating a card, comprising:

defining a data entry screen;

interactively creating a card design by displaying a predetermined card design and modifying specific positions on a planar surface of a card for each layout frame of a video picture, cardholder information fields, and static fields;

capturing cardholder information corresponding to the cardholder information fields using the data entry screen;

previewing an image of a card having the card design including the video picture, cardholder information, and static fields within the predetermined card design substantially as can be printed; and printing the card.

2. The method of claim 1, further comprising identifying a data source for the cardholder information.

3. The method of claim 2, wherein designing a data entry screen includes defining at least one screen field.

4. The method of claim 3, wherein the data source comprises a data base including a plurality of data fields; and wherein the method further comprises linking a selected screen field to a selected data field.

5. The method of claim 4, further comprising linking at least one screen field to at least one card design.

6. The method of claim 2, wherein identifying the data source includes defining a database layout.

7. The method of claim 3, wherein defining at least one screen field includes defining properties for each screen field.

8. The method of claim 7, wherein defining properties includes defining at least one of color, font, capture device, and type of field attributes.

9. The method of claim 1, wherein creating a card design comprises creating a plurality of card designs.

10. The method of claim 1, wherein defining a data entry screen includes defining at least one database.

11. The method of claim 1, further comprising saving the data entry screen definition and the card design prior to inputting data.

12. The method of claim 1, further comprising saving the created card.

13. The method of claim 1, further comprising tracking the number of times the created card has been printed.

* * * * *